United States Patent
Hunger

(10) Patent No.: US 10,219,669 B2
(45) Date of Patent: Mar. 5, 2019

(54) WIPER UNIT AND HYDRAULIC WORKING APPARATUS INCLUDING A WIPER UNIT

(71) Applicant: Dr. Walter Hunger Beteiligungs GmbH & Co. Besitz KG, Wuerzburg (DE)

(72) Inventor: Ingrid Hunger, Lohr (DE)

(73) Assignee: Dr. Walter Hunger Beteiligungs GmbH & Co. Besitz KG, Wuerzburg (DE)

( * ) Notice: Subject to any disclaimer, the term of this patent is extended or adjusted under 35 U.S.C. 154(b) by 553 days.

(21) Appl. No.: 15/012,977

(22) Filed: Feb. 2, 2016

(65) Prior Publication Data
US 2016/0150937 A1    Jun. 2, 2016

Related U.S. Application Data

(63) Continuation of application No. PCT/EP2014/054080, filed on Mar. 3, 2014.

(30) Foreign Application Priority Data

Aug. 5, 2013  (DE) ........................ 10 2013 108 421

(51) Int. Cl.
F16J 15/56    (2006.01)
A47L 11/40    (2006.01)
(Continued)

(52) U.S. Cl.
CPC ...... *A47L 11/4069* (2013.01); *F15B 15/1461* (2013.01); *F16J 15/166* (2013.01); *F16J 15/3232* (2013.01); *F16J 15/56* (2013.01)

(58) Field of Classification Search
CPC ...... A47L 11/4069; F16J 15/56; F16J 15/166; F16J 15/32
See application file for complete search history.

(56) References Cited

U.S. PATENT DOCUMENTS

| 2,368,137 A | 1/1945 | Harmon |
| 2,973,983 A * | 3/1961 | Townsend ............ F16J 15/3232 239/548 |

(Continued)

FOREIGN PATENT DOCUMENTS

| DE | 7222739 U | 9/1974 |
| DE | 4408408 C1 | 5/1995 |

(Continued)

OTHER PUBLICATIONS

International Preliminary Report on Patentability for corresponding International Application No. PCT/EP2014/054080, dated Feb. 18, 2016.

(Continued)

*Primary Examiner* — Michael Jennings
(74) *Attorney, Agent, or Firm* — Jason H. Vick; Sheridan Ross, PC

(57) ABSTRACT

A wiper unit includes a retaining ring, which is arranged in a rotationally symmetric fashion about a longitudinal axis and which includes a contact portion for being received at a housing part, a primary wiper and a secondary wiper, which is axially spaced away from the primary wiper towards the secondary side. A primary lip is formed at the primary wiper and a secondary lip is formed at the secondary wiper. The primary lip and the secondary lip, in a mounted state, contact a sliding surface of a guided slide partner part in a sealing fashion, wherein the primary lip protrudes towards the primary side in a collar-like fashion and wherein the primary lip, at the side thereof facing away from the guided slide partner part, is at least sectionally conically tapered towards the primary side, wherein the primary lip comprises a contact surface arranged for abutting the sliding surface.

20 Claims, 2 Drawing Sheets

(51) Int. Cl.
*F15B 15/14* (2006.01)
*F16J 15/16* (2006.01)
*F16J 15/3232* (2016.01)

(56) References Cited

U.S. PATENT DOCUMENTS

| | | |
|---|---|---|
| 4,566,701 A | 1/1986 | Bomgardner |
| 5,603,509 A | 2/1997 | Stoll et al. |
| 8,617,660 B2 | 12/2013 | Reiner |
| 2005/0067242 A1 | 3/2005 | Vanmechelen et al. |

FOREIGN PATENT DOCUMENTS

| | | |
|---|---|---|
| DE | 102006002347 A1 | 8/2007 |
| DE | 202009013548 U1 | 6/2010 |
| JP | 2006-226455 A | 8/2006 |
| WO | WO 2007/101414 | 9/2007 |

OTHER PUBLICATIONS

International Search Report for corresponding International Application No. PCT/EP2014/054080, dated May 27, 2014.
Written Opinion for corresponding International Application No. PCT/EP2014/054080, dated May 27, 2014.

\* cited by examiner

WIPER UNIT AND HYDRAULIC WORKING APPARATUS INCLUDING A WIPER UNIT

CROSS-REFERENCES TO RELATED APPLICATIONS

This application is a continuation of International Patent Application PCT/EP2014/054080, filed on Mar. 3, 2014 designating the U.S., which international patent application has been published in German language and claims priority from German patent application 10 2013 108 421.4, filed on Aug. 5, 2013. The entire content of the priority applications are fully incorporated by reference herewith.

BACKGROUND

The present disclosure relates to a wiper unit, particularly to an ice wiper for hydraulic working apparatuses, for protecting a secondary side against environ-mental influences occurring at a primary side, particularly for protecting guide arrangements and/or sealing arrangements, comprising a retaining ring, a primary wiper and a secondary wiper. The disclosure further relates to a hydraulic working apparatus, particularly a hydraulic cylinder, comprising such a wiper unit.

Wiper units (also: wiper) of a general kind which may be also referred to as dirt wipers, ice wipers and such like, are known in the art and used for a multitude of cylinder-piston-arrangements which are exposed to exterior environmental influences. Conventional wipers may be for instance used for vehicle shock absorbers and similar hydraulic and/or pneumatic devices, wherein for instance a piston rod is moved relative to a housing. This frequently involves that parts of the piston rod come into direct contact with the environment and are exposed to dirt, icing, humidity and such like, for instance. It is known in the art to implement wipers so as to protect sealing elements, bearing elements and/or guide elements arranged behind the wipers against at least coarse dirt and such like.

Wipers of a general kind are for instance known from WO 2007/101414 A1, DE 10 2006 002 347 A1 and U.S. 2005 006 7242 A1.

However, there are further applications known where conventional wiper units reach limits of performance and may no longer provide a sufficient cleaning function and/or protecting function. This may be for instance the case with building machines. A further, extremely critical case of application may be present with hydraulic machinery and/or hydraulic working apparatuses which are used on the sea (offshore). Such facilities are exposed to humidity, a huge salt content (salinity) and/or extreme temperatures. By way of example, a considerable formation of ice may be frequently observed at piston rods at offshore facilities.

SUMMARY

In view of this, it is an object of the present disclosure to provide further developed wiper units so as to improve the wiping effect and/or cleaning effect thereof.

It is another object of the present disclosure to disclose a wiper unit that enables a simplified handling and assembling.

It is a further object of the present disclosure to present a wiper unit whose tribological characteristics shall not be deteriorated, in spite of the desired optimization of the wiping effect.

These and other objects of the invention are achieved by a wiper unit, particularly an ice wiper for hydraulic working apparatuses, for protecting a secondary side against environmental influences occurring at a primary side, particularly for protecting guide arrangements and/or sealing arrangements, comprising a retaining ring which is arranged in a basically rotationally symmetric fashion about a longitudinal axis and comprises a contact portion for being received at a housing part, a primary wiper, particularly an outer wiper, and a secondary wiper which is axially spaced away from the primary wiper towards the secondary side, wherein a primary lip is formed at the primary wiper and a secondary lip is formed at the secondary wiper, wherein the primary lip and the secondary lip, in a mounted state, contact a sliding surface of a guided slide partner part, particularly a piston rod, in a sealing fashion, wherein the primary lip protrudes towards the primary side in a collar-like fashion and is at least sectionally conically tapered towards the primary side at the side thereof facing the guided slide partner part in the mounted state, and wherein the primary lip comprises a contact surface arranged for abutment at the sliding surface.

In accordance with the above aspect, the primary lip which contacts the piston rod in a sealing fashion, may, due to the conical tapering, act on the piston rod in a manner involving a formation of a particularly favorable stress flow which may considerably improve the wiping effect.

Generally, both the primary wiper and also the secondary wiper are assembled involving a preloading, so as to be able to come into abutment at the slide partner part, particularly the piston rod, in a sealing fashion. To this end, the primary lip and the secondary lip generally comprise an inner diameter which is smaller than an outer diameter of the slide partner part. Such arrangement will form a characteristic stress flow, given a constant wall thickness of the primary lip. For instance, the stress flow of the primary lip could be basically constant in the axial direction. However, since now the primary lip comprises a conical tapering in a direction towards the primary side, the primary lip comprises a smaller wall thickness at the primary-side end thereof than in regions adjoining this portion in a direction towards the secondary side. Even though the same inner diameter is present, the primary-side end may be "easier" widened to an inner diameter of the slide partner part. Hence, in this portion only a relatively small preloading is present. Starting from this low stress level, the preloading may increase with an increasing distance from the primary-side end of the primary lip.

This has the further effect, in an exemplary embodiment, that the primary lip may now include a larger (axial) length without significantly impeding a movement of the slide partner part through excessive friction. This may also further improve the wiping effect.

Hence, the primary lip may be formed initially particularly flexible, at the primary side thereof, and may nevertheless in total provide a large stiffness. The conical tapering of the primary lip may for instance end in a tip or a tip area.

Such a wiper unit is highly suitable for applications involving huge strains, for instance for so-called offshore-applications which may involve the formation of ice and a contact with salt-containing water and moist, salt-containing air.

The primary side may be particularly arranged as an outer side which is exposed to environmental conditions. The secondary side may be particularly arranged as the side which is protected by the wiper unit against environmental influences. Therefore, the secondary side may be also referred to as inner side.

According to a further embodiment, the contact surface of the primary lip is arranged in a cylindrical fashion and comprises an axial extension a of at least 40%, further preferred 50%, even further preferred 60%, of an axial total extension b of the wiper unit.

The conical tapering of the primary lip enables to (axially) extend the contact surface of the primary lip without causing a considerably increased inhibition of the movement of the slide partner part.

In accordance with a further exemplary embodiment, the primary lip axially extends beyond a primary-side end surface of the retaining ring, wherein the axial projection is at least 2%, preferably 5%, further preferred at least 10% of the axial overall extension b of the wiper unit.

Also such projection, which may be jointly formed with the increasing axial extension of the contact surface of the primary lip, may be enabled by the conical tapering of the primary lip, since such design possibly might result in collisions between the primary lip and the retaining ring, given a design without such tapering, which might impair the wiping effect.

According to a further embodiment, the primary lip comprises a tip area at least sectionally projecting in a direction towards the primary side, wherein the secondary lip, particularly at the side thereof facing away from the guided slide partner part in the mounted state, is conically tapered in a direction towards the primary side.

Hence, also the secondary lip may be arranged in a beneficial fashion. Further, the secondary lip may comprise a secondary contact surface comprising an axial extension d of maximal 50%, further preferred maximal 40%, further preferred maximal 30% of the axial extension of the contact surface of the primary lip. Overall, the secondary wiper may comprise an axial length which is maximal 70%, preferably maximal 60%, further preferred maximal 50% of the axial length extension of the contact surface of the primary lip. Hence, compared to conventional wiper units, the axial length of the contact surface of the primary lip may be increased at the cost of the axial length of the contact surface of the secondary surface. In this way, the wiping and cleaning effect of the primary lip may be significantly improved without having to accept a considerable worsening of the wiping and cleaning effect of the secondary lip.

In an appropriate embodiment, the contact portion of the retaining ring of the wiper unit comprises a mounting feature, particularly a conical tapering pointing to the secondary side. A conical tapering may be for instance arranged at an angle with respect to the longitudinal axis of the retaining ring, wherein the angle is at 30° (degree), preferably 20°, and further preferred 10°. The auxiliary mounting aid may involve an axial extension c of about 10%, preferably 20%, further preferred 30%, of an axial overall extension b of the retaining ring and/or the wiper unit.

In this way, as an example, a receiving feature at the housing part provided for the retaining ring does not have to be provided with a specified edge machining, for instance with relief grooves and such like. Nevertheless, the retaining ring may safely abut, at the secondary side thereof, at the housing part. It has been observed that the auxiliary mounting feature may be provided at the retaining ring, wherein the reduced abutment surface of the contact portion with a corresponding (cylindrical) receiving portion of the housing part related thereto has no adverse effects on the stiffness or the functionality of the wiper unit.

In an exemplary embodiment, the primary wiper comprising the primary lip is mounted in a floating fashion and particularly arranged in a fashion radially movable between the retaining ring and the secondary wiper. In this way, on the one hand side, a coaxial over-determination between the primary wiper, the secondary wiper and a slide partner part coupled therewith in the mounted state may be avoided. Further, the primary wiper which generally comprises a larger radial stiffness than the secondary wiper, may, due to the floating arrangement, better compensate radial deformations and/or deflections of the slide partner part. In an exemplary embodiment, the primary wiper is axially secured, at least in the mounted state, by the retaining ring and the secondary wiper.

In an exemplary embodiment, the retaining ring comprises a primary-side axial retaining contour, particularly a flange radially inwardly oriented, for the primary wiper, wherein the contact portion which is arranged in a basically hollow cylindrical fashion and opened towards the secondary side adjoins the retaining contour.

In this way, the retaining ring may be equipped via the secondary side, wherein initially the radially movable primary wiper and subsequently the secondary wiper is inserted. In an exemplary embodiment, the secondary wiper is received at the retaining ring with a sufficient preloading. In this way, the axial position of the radially movable first (primary) wiper may be simply achieved.

According to a further embodiment, the primary wiper is arranged as a metal wiper and particularly made from a bronze material or from stainless steel. In an exemplary embodiment, the secondary wiper is arranged as an elastic wiper ring and particularly produced from an elastic plastic material, preferably from an elastomer. The retaining ring may be for instance made from a plastic material, however, preferably from a metal material, particularly from stainless steel.

In view of the working apparatus, objects of the disclosure are achieved by a hydraulic working apparatus, particularly a hydraulic cylinder, which is provided with a wiper unit according to any of the herein-discussed aspects and embodiments.

The wiper unit may for instance form part of an arrangement for bearing, sealing and/or guiding the slide partner part. Such an arrangement may be for instance formed as a package at the primary-side end thereof the wiper unit is (at an outer side) provided.

It is understood that the above-mentioned features of the disclosure and those to be explained in the following can be applied. Not only in the respective specified combination, but also in other combinations or singly, without departing from the scope of the present disclosure.

BRIEF DESCRIPTION OF THE DRAWINGS

Further features and advantages of the disclosure are disclosed by the following description of a plurality of exemplary embodiments, with reference to the drawings, wherein.

DETAILED DESCRIPTION OF EXEMPLARY EMBODIMENTS

Figure 1:
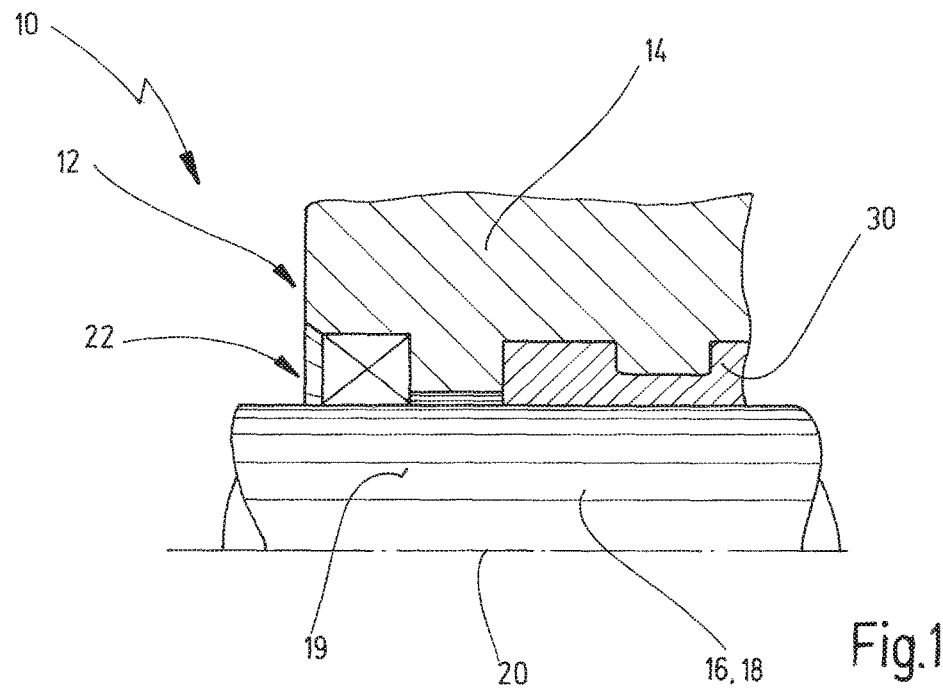
FIG. 1 is a cross-sectional partial side view of a hydraulic working apparatus in which a wiper unit is provided.

FIG. 1 shows a cross-sectional partial side view of a hydraulic working apparatus 10 which may be for instance arranged as a hydraulic cylinder. The hydraulic working apparatus 10 comprises a part fixed to a housing or housing part 14 which encompasses a slide partner part 16. As shown, the slide partner part 16 may be for instance arranged as a piston rod 18 (only partially shown in FIG. 1). The slide partner part 16 comprises a basically rotationally symmetric, particularly cylindrical, sliding surface 19. The slide partner part 16 further comprises a longitudinal axis 20 which may coincide with a corresponding longitudinal axis through the housing part 14. The hydraulic working apparatus 10 may be arranged for generating a relative movement, particularly a sliding movement, along the longitudinal axis 20 between the housing part 14 and the slide partner part 16. Generally, in this context, it is of no significance which of both parts 14, 16 actually is moved in an absolute movement.

The hydraulic working apparatus may be provided with a guiding and/or sealing arrangement 12 which may particularly align the housing part 14 and the slide partner part 16 with respect to one another and seals the housing part 14 and the slide partner part 16 against one another. The hydraulic working apparatus 10 may for instance comprise a high pressure side (also: secondary side) and a low pressure side or pressure-less side (also: primary side). Generally, in the interior of the hydraulic working apparatus 10, huge pressure may be present which may be transferred through hydraulic working mediums, particularly drag oil and such like, so as to effect the relative movement between the housing part 14 and the slide partner part 16.

In particular when at the primary side of the hydraulic working apparatus 10 heavy loads/pollution through dirt, ice, salt-containing air and such like are imminent, the guide and/or sealing arrangement 12 may be provided with a wiper 22 which may cover the guide and/or sealing arrangement 12 to the exterior (in a direction towards the primary side). The wiper 22 is arranged as a basically annular part which revolves in the mounted state about a longitudinal axis 20. Exemplary embodiments of the wiper 22 will be explained hereinafter with reference to FIGS. 2 to 5. Overall, the wiper 22 may be arranged for protecting a guide element 30 (only partially shown in FIG. 2) of the guide and/or sealing arrangement 12 against excessive dirt and/or an excessive entry of foreign objects. Basically, wipers 22 may be arranged for protecting an inner slide partner part 16 against dirt. It may be however also envisaged to arrange the wiper 22 in such a way that an outer slide partner part (which is movable with respect to an inner housing part) can be protected against excessive dirt. It therefore goes without saying that, even though in the following explicit reference is made to wiper units comprising inner wipers, the presented embodiments may be readily transferred also to wiper units comprising outer and externally effective wipers.

Wiper units may be arranged for a multitude of dimensions. For instance, wiper units may be arranged for protecting slide partner parts 16, particularly piston rods 18, having outer diameters in the range of about 10 mm to more than 500 mm against ice and/or claggy/adhesive dirt. Provided that a multitude of possible distinct application cases is present, also dimensional changes deviating from the above may be envisaged. As such, the wiper units may be arranged in a particularly compact fashion and may for instance involve an overall width b (FIG. 3) of maximal 12 mm, preferably maximal 10 mm, and further preferred maximal 8 mm. Further, the wiper units may comprise a small radial installation height which may result in an outer diameter of the wiper units which is for instance only maximal 35 mm, preferably only maximal 25 mm, further preferred only maximal 15 mm larger than an inner diameter which is adapted to the outer diameter of the respective slight partner part 16. Given the multitude of possible distinct application cases, also in this context deviating dimensional ranges may be envisaged.

Figure 2:
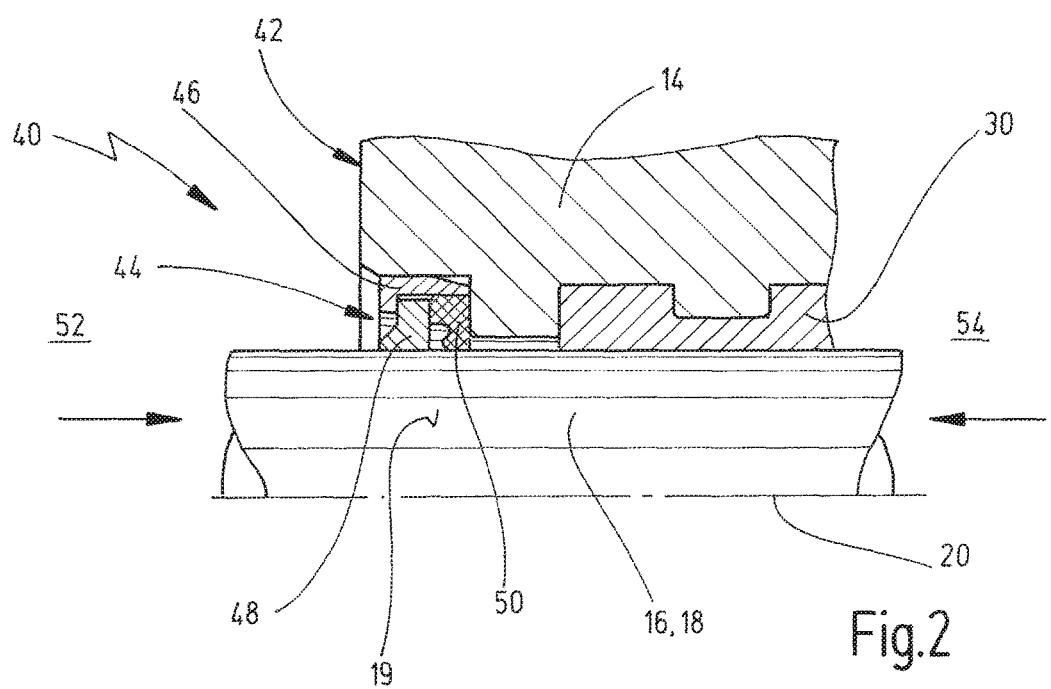
FIG. 2 is a cross-sectional partial side view of a hydraulic working apparatus, in which a wiper unit is provided which is modified with respect to the illustration of FIG. 1.
Figure 3:
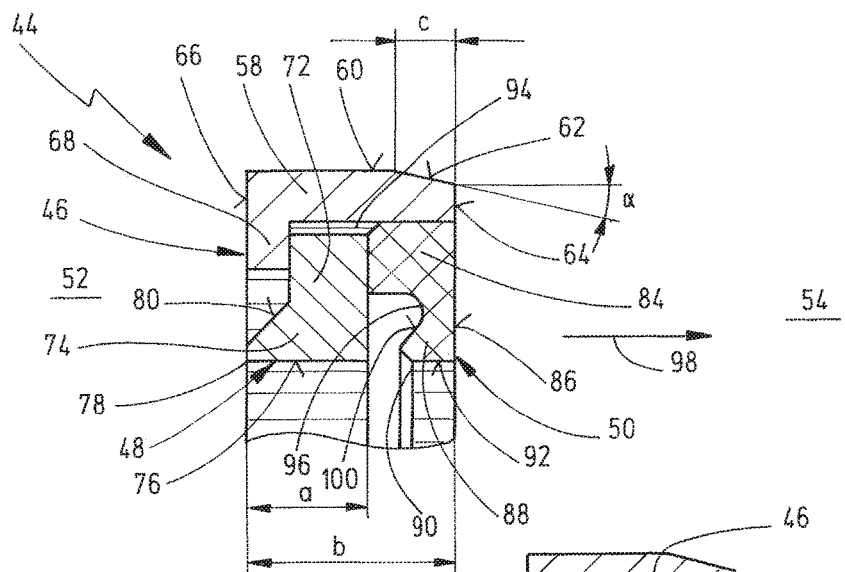
FIG. 3 is a cross-sectional partial view of a wiper unit, for instance in accordance with FIG. 2.
Figure 4:
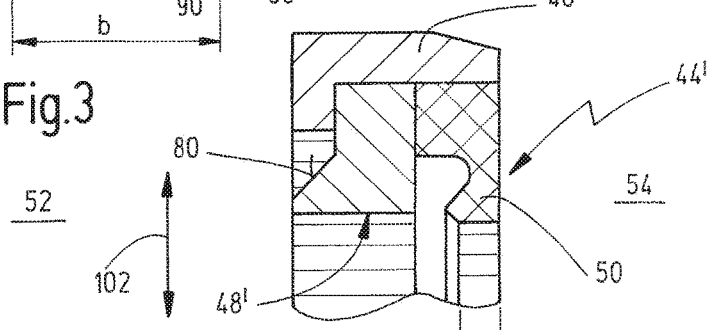
FIG. 4 is a cross-sectional partial view of the wiper unit, for instance in accordance with FIG. 4, wherein a primary wiper is radially displaced.

With reference to FIGS. 2, 3 and 4, an exemplary embodiment of a wiper unit 44 will be explained. By way of example, the wiper unit 44 may be arranged as an ice wiper.

FIG. 2 shows a cross-sectional partial side view of a hydraulic working apparatus 40 which may basically correspond to the hydraulic working apparatus 10 shown in FIG. 1. At the hydraulic working apparatus 40, a guide and/or sealing arrangement 42 is provided in which a wiper unit 44 is implemented. The wiper unit 44 protects a secondary side 54 against excessive dirt or icing, which may adhere at the slide partner part 16 at a primary side 52. Due to the relative movement between the housing part 14 and the slide partner part 16, the dirt may enter the secondary side 54, when an insufficient wiping effect is present, and may for instance impair the guide element 30 and/or further bearing elements and/or sealing elements. In total, this may result in a reduced performance, in leakages and/or even in defects at the hydraulic working apparatus 40.

The wiper unit 44 is particularly adapted to rough environmental conditions (heavy duty applications). The wiper unit 44 comprises a retaining ring 46 which may be made from a metal material, for instance from stainless steel and similar materials. The retaining ring 46 is arranged to be received in a receptacle for the wiper unit 44 formed at the housing part 14 or coupled therewith. The receptacle may be for instance arranged as a receiving groove and/or a receiving indentation. The wiper unit 44 further comprises a first (primary) wiper 48 and a second (secondary) wiper 50. The primary wiper 48 is spaced away from the secondary wiper 50 in a direction towards the primary side 52. The primary wiper 48 and the secondary wiper 50 are arranged at the retaining ring 46. The primary wiper 48 and the secondary wiper 50 are axially spaced from one another. The primary wiper 48 may be also referred to as primary-side wiper. The secondary wiper 50 may be also referred to as secondary-side wiper. In combination, the retaining ring 46, the primary wiper 48 and the secondary wiper 50 may form a wiper package which may be fixed in a secured and defined fashion at the housing part 14 by means of the receptacle for the wiper unit 44. The primary wiper 48 may be for instance made from a metal material, whereas the secondary wiper may be for instance made from a plastic material. Accordingly, the primary wiper 48 may remove rough dirt, for instance rough icing, from the piston rod 18. The secondary wiper 50 may remove remaining dirt from the piston rod 18 which has not been captured by the primary wiper 48.

FIGS. 3 and 4 show detailed view of the wiper unit 44. The retaining ring 46 of the wiper unit 44 comprises a basically hollow cylindrical contact portion 58 at which a contact surface 60 is formed which is, in the mounted state of the wiper unit, mounted to a corresponding receiving surface, for instance of the housing part 14. At the secondary-side end, the contact portion 58 comprises a conical tapering 62 which may adjoin the contact surface 60. The conical tapering 62 is for instance arranged as an insertion chamfer and may simplify assembling the wiper unit 44. The conical tapering 62 may be arranged at an angle α (alpha) with respect to the longitudinal axis 20 (FIG. 2) which may involve the use of 10° (degree), 20° or 30°. The conical tapering 62 may comprise a longitudinal extension c which may for instance involve at least 10%, preferably at least 20%, further preferred at least 30% of an axial overall extension or width b of the wiper unit 44. The insertion chamfer or conical tapering 62 simplifies mounting or assembling the wiper unit 44 in a defined assembly direction which is indicated in FIG. 3 by an arrow designated by 98. The remaining contact surface 60 which may act as a mating surface for an accommodation at the housing part 14 still enables a secured and fixed accommodation of the wiper unit 44.

At the secondary-side end thereof, the retaining ring 46 comprises a secondary end surface 64 which may also act as an abutment surface for an axial abutment at the housing part 14. At the primary-side end thereof facing away from the secondary-side end, the retaining ring 46 comprises a primary-side end surface 66. In this area, the retainer ring 46 may further form a radially inwardly extending flange 68. In combination, the flange 68 of the retaining ring 46 and an axial abutment surface of the housing part 14 may define and secure an axial position of the primary wiper 48 and the secondary wiper 50.

The primary wiper 48 comprises a main body 72 which defines an outer perimeter of the primary wiper 48. In particular, the main body 72 may comprise an outer diameter which is noticeably smaller than an inner diameter of the contact portion 58 of the retaining ring 46. In other words, the primary wiper 48 may be received at the retaining ring 46 in a radially displaceable fashion. In this way, the primary wiper 48 may perform compensation movements. For instance, the main body 72 may comprise an outer diameter of less than 99%, preferably less than 97%, further preferred of less than 95% of an inner diameter of the retaining ring 46. A clearance which is present in case of a nominal orientation of the primary wiper 48 and the secondary wiper 50 (for instance coaxially with respect to the longitudinal axis 20) is indicated in FIG. 3 by 94. This clearance may be used for compensation movements of the primary wiper 48, for instance when the slide partner parts 16 vibrates or is deformed in another way.

A primary lip 74 adjoins the main body 72 of the primary wiper 48. In a direction towards the longitudinal axis 20 and/or the slide partner part 16, the primary lip 74 comprises a contact surface 76 which is arranged for contacting a sliding surface 19 of the slide partner part 16 (FIG. 2). In particular, the contact surface 76 may comprise an inner diameter which is deliberately chosen to be slightly smaller than an outer diameter of the slide partner part 16. It is ensured in this way that the primary wiper 48 is mounted to the slide partner part 16 in a preloaded fashion. At the primary-side end thereof, the primary lip 74 comprises a tip area 78 which may be for instance arranged as a revolving edge. The primary lip 74 is arranged for removing and/or wiping off coarse dirt, icing and such like which may be moved with the moving slide partner part 16 from the primary side 52 towards the wiper unit 44.

The primary lip 74 is further characterized by an at least sectionally formed tapering or conical tapering 80 facing the primary side 52. In other words, the primary lip 74 may be inclined in a direction towards the primary side 52. This may thus result in a cross-sectional view, in a wall thickness characteristic for the primary lip 74 involving only small wall thicknesses at the primary side 52, however also involving increasing wall thicknesses towards the secondary side 54. In this way, a favorable stress flow may be provided at the primary lip 74 which tightly adheres to the slide partner part 16 in the mounted state. This may improve the wiping effect and/or the separating effect.

The primary lip 74 elucidated in FIG. 3 is further characterized by a large efficient width a. In an exemplary embodiment, the width a of the primary lip 74 which may basically correspond to the width of the contact surface 76 is at least about 40%, preferably at least about 50%, further preferred at least about 60% of the overall width b of the wiper unit 44. The overall width b may particularly correspond to the width (also: axial longitudinal extension) of the retaining ring 46.

The secondary wiper 50 of the wiper unit 44 is axially offset from the primary wiper 48 in a direction towards the secondary side 54. The secondary wiper 50 comprises a main body 84 which defines an outer diameter of the secondary wiper 50. Particularly, the main body 84 may comprises an outer diameter which is adapted to an inner diameter of the retaining ring 48 so as to ensure a sufficiently fixed and secured radial reception of the second wiper 50 at the retaining ring 46. In other words, the secondary wiper 50, in contrast to the primary wiper 48, does not comprise radial play with respect to the retaining ring 46. At the secondary-side end thereof, the secondary wiper 50 forms a secondary end surface 86 which may be basically congruent to the secondary end surface 64 of the retaining ring 46. Hence, in the mounted state of the wiper unit 44, a defined axial installation space for the first wiper 48 may be present which may, on the one hand, effect a secured position and may, on the other hand, provide sufficient installation space for radial compensation movements of the primary wiper 48.

A secondary lip 88 which ends in a tip area 90 adjoins the main body 84 of the secondary wiper 50. The tip area 90 may particularly comprise a revolving edge. At the side thereof facing the slide partner part 16 and/or the longitudinal axis 20 in the mounted state, the secondary lip 88 further comprises a contact surface 92. FIG. 4 elucidates a width of the contact surface 92. At a primary-side transition between the main body 84 and the secondary lip 88 a basically annular revolving recess 96 is formed in the secondary wiper 50. In this way, a desired elasticity and deformability, particularly of the secondary lip 88, may be provided. The recess 96 may transition into a conical surface or tapering 100 extending in an inclined fashion in a direction towards the primary side 52.

The retaining ring 46 may be performed from a metal material, particularly from a corrosion-resistant material, for instance from a stainless steel. Preferably, also the primary wiper 48 is formed from a metal material or a metal-containing material. This may particularly involve a bronze material. However, also brass, steel, particularly stainless steel, and such like may be envisaged. The secondary wiper 50 may be formed from a plastic material, particularly from a sufficiently elastic plastic material. It may be envisaged to form the secondary wiper 50 for instance from polyurethane (PUR). It may be generally envisaged to form the secondary wiper 50 from elastomer material, for instance from thermoplastic elastomers or similar materials.

A combined view of FIGS. 3 and 4 elucidates the radial displaceability of the primary wiper 48. In other words, the primary wiper 48 may be arranged between the retaining ring 46 and the secondary wiper 50 in a floating fashion so as to react to deformations of the slide partner part 16 (FIG. 2). The primary wiper designated in FIG. 4 by 48' has performed a radial compensation movement whose direction is indicated in FIG. 4 by an arrow designated by 102. The compensation movement 102 is basically performed in a fashion perpendicular to the longitudinal axis 20 (FIG. 2). In cases when the secondary wiper 50 is not arranged at the retaining ring 46 in a floating or radially displaceable fashion, the secondary wiper 50 may however provide a sufficiently large elasticity so that also the secondary wiper 50 may react to displacements of the slide partner part 16. This is however mainly performed by elastic deformations of the secondary wiper.

Figure 5:
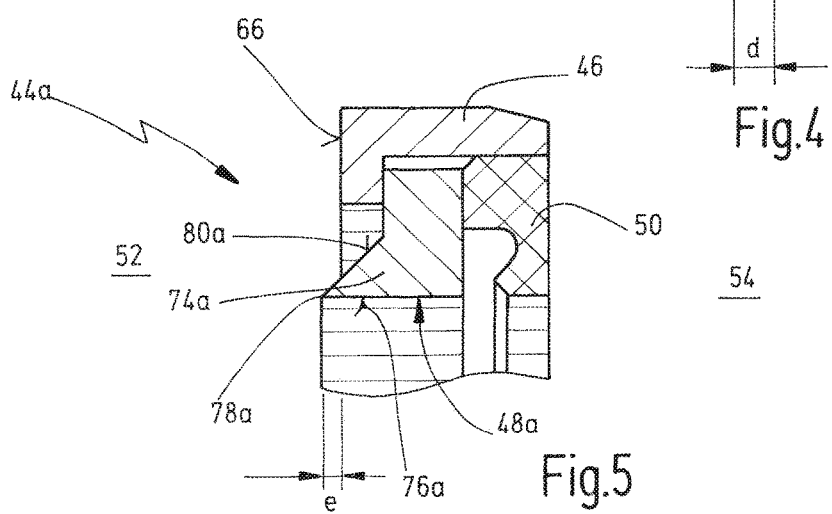
FIG. 5 is a cross-sectional partial view of a wiper unit in accordance with an embodiment which is modified with respect to the embodiment of FIG. 3.

FIG. 5 elucidates an alternative embodiment of a wiper unit 44a, which basically corresponds to the wiper unit 44 elucidated with reference to FIGS. 3 and 4.

At the wiper unit 44a a primary wiper 48a is provided which comprises a primary lip 74a comprising a distinctly formed tip area 78a. In particular, the tip area 78a is axially extended in a direction towards the primary side 52, compared to the tip area 78a (FIG. 3). This may even involve that the tip area 78a is basically formed by a single revolving edge in which the tapering 80a and the contact surface 76a of the primary wipers 48a merge into one another and/or intersect one another. In this way, the width or efficient (axial) length a of the primary wipers 48a may be further increased. In an exemplary embodiment, the tip area 78a extends in a direction towards the primary side 52 beyond the primary-side end surface 66 of the retaining ring 46. This may result in a projection e which involves at least 2%, preferably 5%, further preferred at least 10% of the width b or axial overall extension of the wiper unit 44 and/or the retaining ring 46.

What is claimed is:

1. An ice wiper unit for hydraulic working apparatuses, for protecting a secondary side of a guide or sealing arrangement against environmental influences at a primary side thereof, the ice wiper unit comprising
a retaining ring which is arranged in a fashion basically rotationally symmetric about a longitudinal axis,
an outer, primary wiper, and
a secondary wiper,
wherein the retaining ring comprises a contact portion for being mounted to a housing part,
wherein the secondary wiper is axially spaced away from the primary wiper towards the secondary side,
wherein a primary lip is formed at the primary wiper and a secondary lip is formed at the secondary wiper,
wherein the primary lip and the secondary lip contact, in a mounted state, a sliding surface of a guided slide partner part in a sealing fashion,
wherein the guided slide partner part is arranged as a piston rod,
wherein the primary lip protrudes towards the primary side in a collar-like fashion,
wherein the primary lip, at the side thereof facing away from the guided slide partner part in the mounted state, is at least sectionally conically tapered towards the primary side,
wherein the primary lip comprises a contact surface arranged for contacting the sliding surface, and
wherein the primary wiper is arranged in a floating fashion between the retaining ring and the secondary wiper.

2. The ice wiper unit as claimed in claim 1, wherein the primary wiper is arranged in a radially movable fashion between the radial retaining ring and the secondary wiper.

3. The ice wiper unit as claimed in claim 2, wherein the radial retaining ring and the secondary wiper define an axial position of the primary wiper therebetween.

4. The ice wiper unit as claimed in claim 1, wherein the primary wiper is arranged as a metal wiper and manufactured from a bronze material or from stainless steel, and wherein the secondary wiper is arranged as an elastic wiper ring and manufactured from an elastomer material.

5. A wiper unit, for protecting a secondary side against environmental influences at a primary side, the wiper unit comprising a retaining ring which is arranged in a fashion basically rotationally symmetric about a longitudinal axis, and which comprises a contact portion for being received at a housing part, a primary wiper, and a secondary wiper, wherein the retaining ring comprises a contact portion for being mounted to a housing part, wherein the secondary wiper is axially spaced away from the primary wiper towards the secondary side, wherein a primary lip is formed at the primary wiper and a secondary lip is formed at the secondary wiper, wherein the primary lip and the secondary lip contact, in a mounted state, a sliding surface of a guided slide partner part in a sealing fashion, wherein the primary lip protrudes towards the primary side in a collar-like fashion, wherein the primary lip, at the side thereof facing away from the guided slide partner part in the mounted state, is at least sectionally conically tapered towards the primary side, and wherein the primary lip comprises a contact surface arranged for contacting the sliding surface, and wherein the primary wiper is arranged in a floating fashion between the retaining ring and the secondary wiper.

6. The wiper unit as claimed in claim 5, wherein the contact surface of the primary lip is arranged in a cylindrical fashion and comprises an axial extension of at least 40% of an axial overall extension of the wiper unit.

7. The wiper unit as claimed in claim 5, wherein the primary lip axially extends beyond a primary-side end surface of the retaining ring, and wherein the axial projection is at least 2% of an axial overall extension of the wiper unit.

8. The wiper unit as claimed in claim 5, wherein the secondary lip comprises a tip area at least sectionally protruding towards the primary side, and wherein the secondary lip is conically tapered towards the primary side.

9. The wiper unit as claimed in claim 5, wherein the contact portion of the retaining ring comprises an auxiliary mounting feature arranged as a conical tapering pointing to the secondary side.

10. The wiper unit as claimed in claim 5, wherein the primary wiper is mounted in a floating fashion.

11. The wiper unit as claimed in claim 10, wherein the primary wiper is arranged in a radially movable fashion between the retaining ring and the secondary wiper.

12. The wiper unit as claimed in claim 10, wherein the radial retaining ring and the secondary wiper define an axial position of the primary wiper therebetween.

13. The wiper unit as claimed in claim 5, wherein the retaining ring comprises a primary-side axial retaining contour for the primary wiper, wherein the contact portion is arranged in a basically hollow cylindrical fashion and adjoins the retaining contour, and wherein the contact portion is opened towards the secondary side.

14. The wiper unit as claimed in claim 13, wherein the primary-side axial retaining contour is a radially inwardly facing flange extending from the contact portion.

15. The wiper unit as claimed in claim 5, wherein the primary wiper is arranged as a metal wiper.

16. The wiper unit as claimed in claim 15, wherein the primary wiper is manufactured from a bronze material or from stainless steel.

17. The wiper unit as claimed in claim 5, wherein the secondary wiper is arranged as an elastic wiper ring.

18. The wiper unit as claimed in claim 17, wherein the secondary wiper is manufactured from an elastic plastic material or from an elastomer material.

19. The wiper unit as claimed in claim 5, wherein the retaining ring is manufactured from stainless steel.

20. A hydraulic working apparatus arranged as a hydraulic cylinder, comprising a wiper unit, for protecting a secondary side against environmental influences occurring at a primary side, the wiper unit comprising a retaining ring which is arranged in a fashion basically rotationally symmetric about a longitudinal axis, and which comprises a contact portion for being received at a housing part, a primary wiper, and a secondary wiper, wherein the retaining ring comprises a contact portion for being mounted to a housing part, wherein the secondary wiper is axially spaced away from the primary wiper towards the secondary side, wherein a primary lip is formed at the primary wiper and a secondary lip is formed at the secondary wiper, wherein the primary lip and the secondary lip contact, in a mounted state, a sliding surface of a guided slide partner part in a sealing fashion, wherein the primary lip protrudes towards the primary side in a collar-like fashion, wherein the primary lip, at the side thereof facing away from the guided slide partner part in the mounted state, is at least sectionally conically tapered towards the primary side, and wherein the primary lip comprises a contact surface arranged for abutting the sliding surface, and wherein the primary wiper is arranged in a floating fashion between the retaining ring and the secondary wiper.

* * * * *